(No Model.) 2 Sheets—Sheet 1.

M. M. SUPPES.
ELECTRIC WELDING MACHINE.

No. 500,973. Patented July 4, 1893.

WITNESSES:
Hamilton E. Ford
Patrick M. Boyd

INVENTOR
Maximilian M. Suppes
BY
E. W. Cady
ATTORNEY.

(No Model.) 2 Sheets—Sheet 2.
M. M. SUPPES.
ELECTRIC WELDING MACHINE.
No. 500,973. Patented July 4, 1893.
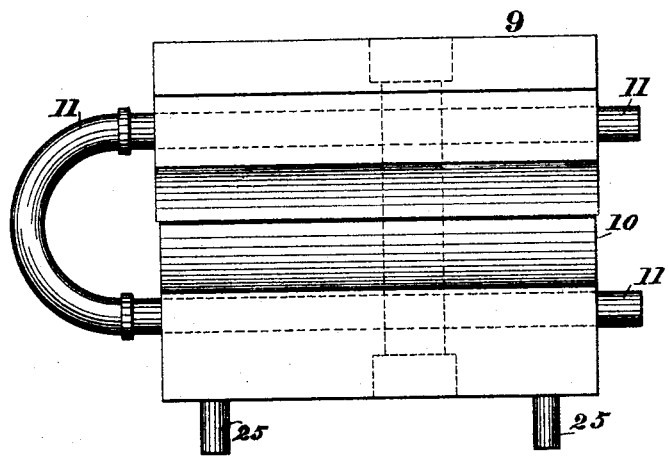
Fig. 5.
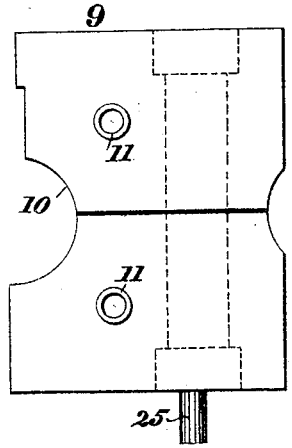
Fig. 6.
Fig. 7.
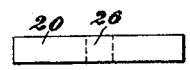
Fig. 8.
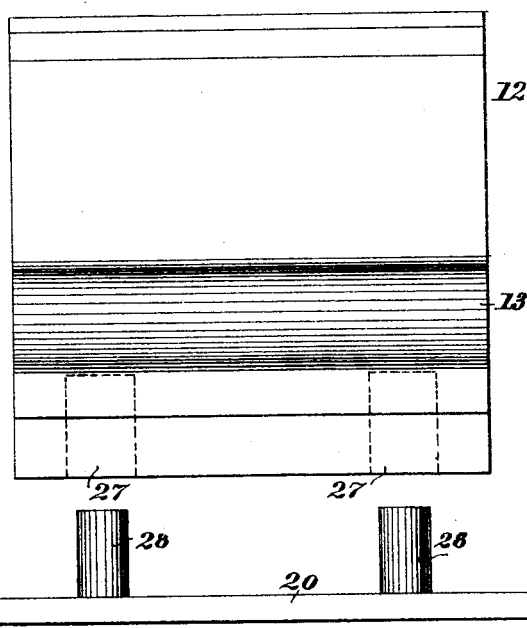
Fig. 9.
Fig. 11.
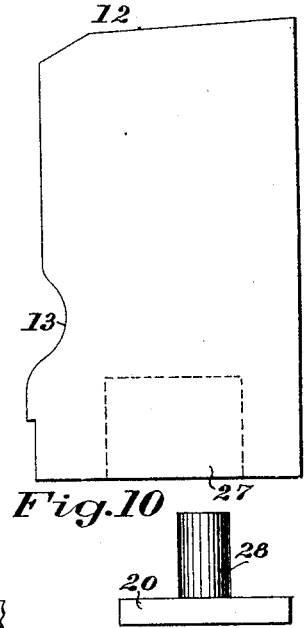
Fig. 10.
Fig. 12.
WITNESSES:
Hamilton E. Ford
Patrick M. Boyd
INVENTOR
Maximilian M. Suppes
BY
E. W. Cady
ATTORNEY.

UNITED STATES PATENT OFFICE.

MAXIMILIAN M. SUPPES, OF JOHNSTOWN, PENNSYLVANIA.

ELECTRIC WELDING MACHINE.

SPECIFICATION forming part of Letters Patent No. 500,973, dated July 4, 1893.

Application filed September 10, 1892. Serial No. 445,578. (No model.)

*To all whom it may concern:*

Be it known that I, MAXIMILIAN M. SUPPES, of Johnstown, Pennsylvania, have invented a new and useful Improvement in Electric Welding Machines, of which the following is a specification.

This invention relates to electric welding machines for integrally uniting bars or railroad rails, and has for its object to provide in an electric welding machine of this character an adjustable apparatus by means of which the "contact blocks" and "swaging blocks" may be supported and alternately moved into position between the joint to be welded and the horizontal plungers.

The invention consists in an apparatus of this character constructed and arranged as hereinafter described and claimed.

In the accompanying drawings, in which is shown so much of an electric welding machine as is necessary to illustrate the invention, similar figures of reference refer to like parts.

Figure 1:
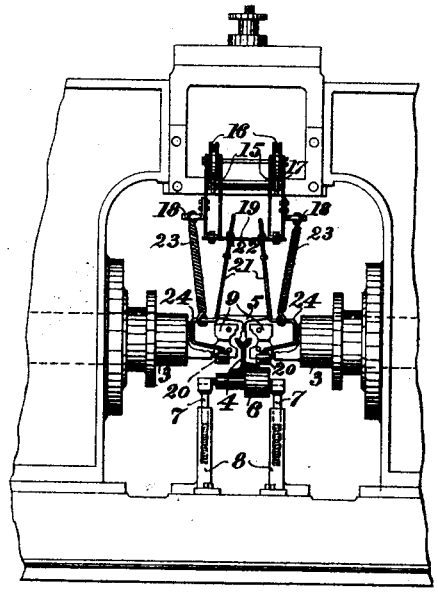
Figure 2:
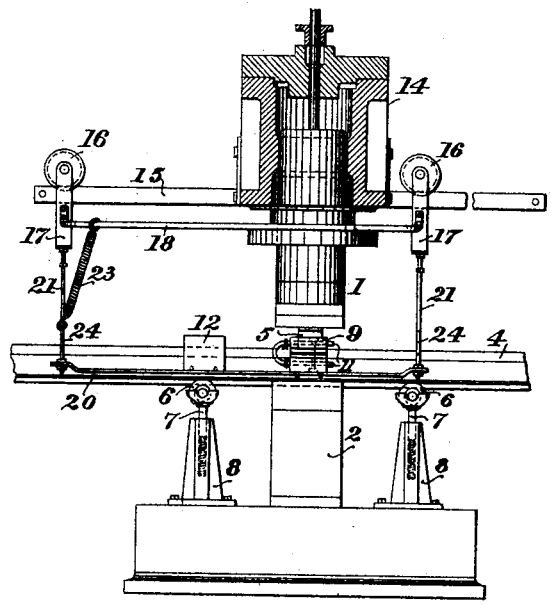
Figure 3:
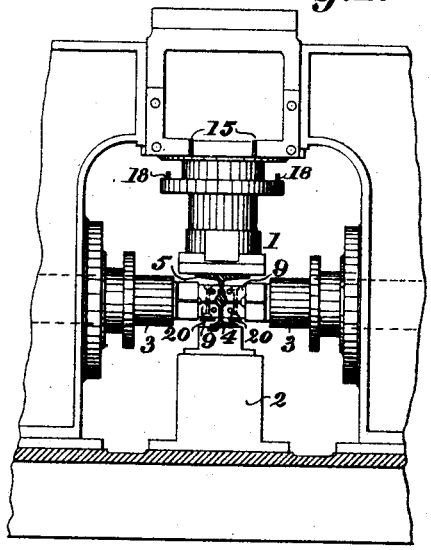
Figure 4:
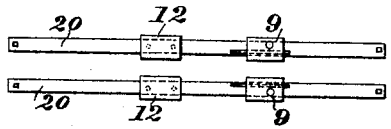

Figure 1 is an end view of an electric welding machine with parts removed, showing the invention applied and the contact blocks away from the joint to be welded. Fig. 2 is a side view of the invention with the sides of the electric welding machine removed. Fig. 3 is an end view of the electric welding machine with parts removed, showing the contact blocks brought against the welded joint. Fig. 4 is a detail view showing the contact and swaging blocks resting on their supporting bars. Fig. 5 is a view of one of the contact blocks enlarged and Fig. 6 is an end view thereof. Fig. 7 is a side view of a portion of one of the block supporting bars, showing the contact block connections, and Fig. 8 is an end view thereof. Fig. 9 is a view of one of the swaging blocks enlarged, and Fig. 10 is an end view thereof. Fig. 11 is a side view of a portion of one of the block supporting bars showing the swage block connections, and Fig. 12 is an end view thereof.

This invention may be constructed and arranged as follows:

1 indicates the head of the vertical hydraulic plunger, of an electric welding machine, 2 the anvil block or die, and 3 the horizontal hydraulic plungers, which serve to alternately press the contact blocks and swaging blocks against the joint to be welded.

To illustrate the operation of the device, an inverted rail 4 and rail support 5, are shown located between the anvil block 2, and the plunger head 1. To aid in supporting the rail 4 and to enable it to be moved over the anvil block, suitable supports are provided in front of and behind the anvil, which may consist, as shown, of rollers 6 located in vertically adjustable screw rods 7 mounted in supports 8.

To more clearly illustrate the invention the vertical plunger head and other parts are omitted in Fig. 1.

9 indicates the contact blocks, preferably made in two parts bolted together and curved on one side at the meeting edges of the two parts, so as to form a circular groove 10, adapted to conform to the joint to be welded.

11 indicates the water circulating pipe to cool the block 9, of a U shape, extending through the block 9 and having projecting ends to connect flexible water pipes thereto.

12 indicates the swaging blocks formed with a circular groove 13 to conform to the bulb of the welded joint.

The apparatus for supporting and alternately moving the contact and swaging blocks into position between the horizontal plungers and the joint to be welded may be constructed and arranged as follows: Secured to the cylinder 14 of the plunger 1, and extending lengthwise of the machine are two rails 15, on which are mounted grooved rollers 16 having their supports 17 connected by rods 18. The supports 17 are connuected together in pairs by cross-bars 19.

20 indicates horizontal bars to support the contact and swaging blocks, said bars 20 extending lengthwise of the machine just above the anvil block 2, and being suspended from cross-bars 19 by means of the rods 21, having their upper ends projecting through slots in cross-bars 19, so as to permit of their swinging and held on the bars 19 by nuts 22, so as to be vertically adjusted if desired.

The bars 20 are normally held away from each other, so as to permit the rail 4 and support 5 to be located on the anvil block, by means of coiled springs 23 connected at one end to the rods 18, and at the other to the bent portions 24 of rods 21 holding the latter in an inclined position as shown in Fig. 1.

The contact blocks 9 may be detachably connected to the bars 20 in any suitable manner, as for example, by means of the pins 25 on the blocks 9 engaging holes or sockets 26 in the bars 20, and the swaging blocks 12 are also detachably connected to the bars 20, at a suitable distance from blocks 9, by means of sockets 27 on the blocks 12, into which project pins 28 on the bars 20.

By means of the block supporting and shifting apparatus just described, when the rail 4 and support 5 are in position to be welded, as in Fig. 1, between the anvil block 2 and the plunger head 1 bearing against the support 5, the rods 21 may be seized and the bars 20 drawn along until the contact blocks 9 are brought into position opposite to the joint to be welded. The horizontal plungers 3 are then moved toward the joint to be welded, thereby swinging the horizontal bars toward each other and pushing the contact blocks against the side joint. The joint being highly heated and welded together by the electric current passing through the contact blocks, the plungers 3 are drawn back permitting the horizontal bars 20 to be drawn apart by springs 23 and the bars 20 drawn along by means of the rods 21, to move the blocks 9 away from the joint and bring the swaging blocks 12 opposite to the said joint and between it and the plungers 3. The plungers 3 are again advanced, causing the swaging blocks to be swung and pressed against the welded joint and give it a face finish.

While I have set forth the block support as suspended, it is obvious that it may be supported from below adjacent to the anvil, so as to be operated and adjusted in like manner without departing from the essential features of the invention.

The contact blocks 9 are constructed in two halves, the upper and lower and these are insulated from each other. The upper and lower blocks shown in the drawing Fig. 3, between the contacts 9 and the plungers 3 are the two poles of a transformer. The current passes from one of these poles into the half of the contact block against it, thence through the webs of the rail and support to be welded and out through the other half of the contact to the other pole of the transformer. The same is true of the other side of the machine so that there is a current applied to both sides of the rail and support. When the swaging block is being used the current is cut off from the machine and the transformers are used only to transmit the pressure from plungers to swaging blocks.

Having described my invention, I claim—

1. In an electric welding apparatus, substantially as herein set forth, a contact and swaging block support, movable between plungers and transversely thereto and contact and swaging blocks mounted thereon, whereby the contact blocks may be moved into and out of position, in front of the plungers, alternately with the swaging blocks.

2. In an electric welding machine substantially as herein set forth, a support, movable in front of and transversely to a plunger and having contact and swaging blocks mounted thereon, whereby the contact block alternately with the swaging block may be moved into position in front of the plunger, and be pressed by the latter against the joint to be welded.

3. In an electric welding machine substantially as herein set forth, supports, movable transversely to plungers and toward each other, and having contact and swaging blocks mounted thereon, whereby the contact blocks are alternately with the swaging blocks placed in position in front of said plungers and adapted to be pressed toward each other by the latter.

4. In an electric welding apparatus, substantially as herein set forth, supports movable transversely to plungers, contact and swaging blocks mounted thereon, said supports normally holding the said blocks away from each other.

5. In an electric welding apparatus, as herein set forth, the combination with a vertical plunger, an anvil, and horizontal plungers, of a swinging frame, supporting contact and swaging blocks, suspended to travel transversely to the horizontal plungers and provided with reacting springs, whereby the contact blocks may alternately with the swaging blocks be moved into and out of position in front of the horizontal plungers and be pressed toward each other by the latter.

6. In an electric welding apparatus, substantially as herein set forth, a support, movable between plungers and transversely thereto, blocks mounted thereon whereby the blocks may be moved into and out of position in front of the plungers.

7. In an electric welding apparatus, substantially as herein set forth, a support, movable transversely to plungers, blocks mounted thereon, said support normally holding the blocks away from each other.

8. In an electric welding apparatus, as herein set forth, the combination with a vertical plunger, an anvil, and horizontal plungers, of a swinging frame supporting blocks, suspended to travel transversely to the horizontal plungers, and provided with, reacting springs, whereby the blocks may be moved into and out of position in front of the horizontal plungers and be pressed toward each other by the latter.

In testimony whereof I have affixed my signature in presence of two witnesses.

MAXIMILIAN M. SUPPES.

Witnesses:
WILLIAM D. HALL,
REUBEN E. GLASS.